United States Patent
Carter et al.

(10) Patent No.: US 10,482,777 B2
(45) Date of Patent: Nov. 19, 2019

(54) SYSTEMS AND METHODS FOR CONTENT ANALYSIS TO SUPPORT NAVIGATION AND ANNOTATION IN EXPOSITORY VIDEOS

(71) Applicant: FUJI XEROX CO., LTD., Tokyo (JP)

(72) Inventors: Scott Carter, Los Altos, CA (US); Matthew L. Cooper, San Francisco, CA (US); Laurent Denoue, Verona (IT)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/939,081

(22) Filed: Jul. 10, 2013

(65) Prior Publication Data

US 2014/0245152 A1    Aug. 28, 2014

Related U.S. Application Data

(63) Continuation-in-part of application No. 13/775,116, filed on Feb. 22, 2013, now Pat. No. 9,892,761.

(51) Int. Cl.
*G06F 3/0484* (2013.01)
*G09B 5/02* (2006.01)
(Continued)

(52) U.S. Cl.
CPC ............ *G09B 5/02* (2013.01); *G11B 27/28* (2013.01); *H04N 21/431* (2013.01);
(Continued)

(58) Field of Classification Search
CPC ............ G06F 3/0484; G06F 17/30387; G06F 3/1446; G09B 5/02; G11B 27/28;
(Continued)

(56) References Cited

U.S. PATENT DOCUMENTS 5,063,600 A * 11/1991 Norwood ............ G06F 3/04883
345/173
6,356,297 B1    3/2002 Cheng
(Continued)

OTHER PUBLICATIONS

Magnatag, TrackWall Sliding Panel Display System, Nov. 28, 2012, YouTube video url https://www.youtube.com/watch?v=FK1UdGltPkc (Year: 2012).*
(Continued)

*Primary Examiner* — Ryan F Pitaro
*Assistant Examiner* — Parmanand D Patel
(74) *Attorney, Agent, or Firm* — Procopio, Cory, Hargreaves & Savitch LLP

(57) ABSTRACT

Online educational videos are often difficult to navigate. Furthermore, most video interfaces do not lend themselves to note-taking. Described system detects and reuses boundaries that tend to occur in these types of videos. In particular, many educational videos are organized around distinct breaks that correspond to slide changes, scroll events, or a combination of both. Described algorithms can detect these structural changes in the video content. From these events the system can generate navigable overviews to help users searching for specific content. Furthermore, these boundary events can help the system automatically associate rich media annotations to manually-defined bookmarks. Finally, when manual or automatically recovered spoken transcripts are available, the spoken text can be combined with the temporal segmentation implied by detected events for video indexing and retrieval. This text can also be used to seed a set of text annotations for user selection or be combined with user text input.

20 Claims, 8 Drawing Sheets

(51) Int. Cl.
*H04N 21/431* (2011.01)
*G11B 27/28* (2006.01)
*H04N 21/44* (2011.01)
*H04N 21/472* (2011.01)
*G11B 27/34* (2006.01)

(52) U.S. Cl.
CPC . *H04N 21/44008* (2013.01); *H04N 21/47217* (2013.01); *G11B 27/34* (2013.01)

(58) Field of Classification Search
CPC ............. G11B 27/34; H04N 21/47217; H04N 21/44008; H04N 21/431
USPC .................................................. 715/720, 723
See application file for complete search history.

(56) References Cited

U.S. PATENT DOCUMENTS

| | | | |
|---|---|---|---|
| 6,580,437 B1* | 6/2003 | Liou | G06F 16/7844 715/719 |
| 7,096,428 B2 | 8/2006 | Foote et al. | |
| 8,280,158 B2 | 10/2012 | Adcock et al. | |
| 8,300,117 B2 | 10/2012 | Adcock et al. | |
| 8,334,902 B2 | 12/2012 | Golovchinsky et al. | |
| 8,639,032 B1* | 1/2014 | Voorhees | G09B 5/02 382/176 |
| 2005/0002647 A1* | 1/2005 | Girgensohn | G11B 27/034 386/243 |
| 2005/0094014 A1* | 5/2005 | Haas et al. | 348/333.01 |
| 2006/0117254 A1* | 6/2006 | Altman | G06F 17/211 715/252 |
| 2006/0253781 A1* | 11/2006 | Pea | G11B 27/034 715/723 |
| 2007/0126755 A1* | 6/2007 | Zhang | G06F 17/30843 345/619 |
| 2007/0245243 A1* | 10/2007 | Lanza | G06F 17/30817 715/723 |
| 2008/0313541 A1* | 12/2008 | Shafton | G06F 17/30817 715/725 |
| 2011/0221766 A1* | 9/2011 | Ko | G06F 3/1208 345/629 |
| 2012/0077522 A1* | 3/2012 | Mate | H04N 21/2187 455/456.3 |
| 2012/0275764 A1* | 11/2012 | Eyer | 386/241 |
| 2014/0199045 A1* | 7/2014 | Lee | H04N 5/783 386/240 |

OTHER PUBLICATIONS

Magnatag, TrackWall Sliding Panel Display System, Nov. 28, 2012, You Tube video url https://www.youtube.com/watch?v=FK1UdGtPkc (Year: 2012).*
Don Kimber et al. Trailblazing: Video Playback Control by Direct Object Manipulation. Proc. IEEE ICME 2007.
DimP—A Direct Manipulation Video Player. http://www.lri.fr/~dragice/dimp/. Accessed May 15, 2013.
Panorama Maker software application. http://www.arcsoft.com/panorama-maker/. Accessed May 15, 2013.
A. Fitzgibbon, A. Zisserman. Automatic 3D Model Acquisition and Generation of New Images from Video Sequences. European Signal Processing Conference, p. 1261-1269, 1998.
Reinhard Koch et al. Automatic 3D Model Acquisition from Uncalibrated Image Sequences. Computer Graphics International, 1998. Proc. pp. 597-604.
Paula. Viola. Alignment by Maximization of Mutual Information. International Journal of Computer Vision, 24(2) p. 137-154, 1997.
Correa, C., & Ma, K. Dynamic video narratives. ACM Trans. Graph. 29, 4, Article 88 (Jul. 2010).
David Hilbert. Autonomous presentation capture in corporate and educational settings. in Proc. e-Learning, 2008, pp. 239-246.
Dan B Goldman. Schematic storyboarding for video visualization and editing. ACM Transactions on Graphics (TOG)—Proc. of ACM SIGGRAPH 2006. vol. 25(3). 2006. pp. 862-871.
Andreas Girgensohn. Adaptive Clustering and Interactive Visualizations to Support the Selection of Video Clips. In Proceedings of ICMR. 2011, 34-34.
Chekuri Choudary et al. Trailblazing: Summarization of Visual Content in Instructional Videos. IEEE Transactions on Multimedia, vol. 9, No. 7, Nov. 2007.
Rong Jin, Yanjun Qi, Alexander Hauptmann, A Probabilistic Model for Camera Zoom Detection, Proc. Intl. Conf on Pattern Recognition, 2002.

* cited by examiner

SYSTEMS AND METHODS FOR CONTENT ANALYSIS TO SUPPORT NAVIGATION AND ANNOTATION IN EXPOSITORY VIDEOS

CROSS-REFERENCE TO RELATED PATENT APPLICATION

The present patent application relies upon, claims the benefit of priority from, and is a continuation-in-part of U.S. patent application Ser. No. 13/775,116 filed on Feb. 22, 2013, the entire disclosure of which is incorporated by reference herein.

BACKGROUND OF THE INVENTION

Technical Field

The disclosed embodiments relate in general to systems and methods for video content processing and, more specifically, to systems and methods for content analysis to support navigation and annotation in expository videos.

Description of the Related Art

Online educational videos are often lengthy and difficult to navigate. Furthermore, most video interfaces do not lend themselves to note-taking, a key feature for students learning new material. The timeline is the standard video navigation control, linking the location of a cursor in a slider to a temporal position in a video. The abstraction the aforesaid navigation control provides is useful for many reasons, including that users are able to rapidly jump to different time points within the video and maintain an awareness of when in the video they currently are. However, for educational videos, knowing where the user is with respect to the educational material being presented can be just as important. While there exist interfaces enabling users to navigate the video temporarily, there are no solutions focused on abstractions that allow users to navigate an educational video based on the content that is being presented in the video the same way they can use a timeline video control for temporal navigation.

Therefore, the conventional video navigation techniques are deficient due to the lack of spatial navigation solutions, as for many educational videos, it would be more desirable for users to navigate video content using a spatial abstraction rather than a temporal abstraction (i.e., the standard timeline interface).

SUMMARY OF THE INVENTION

The embodiments described herein are directed to methods and systems that substantially obviate one or more of the above and other problems associated with conventional methods for navigating expository video.

In accordance with one aspect of the embodiments described herein, there is provided a computer-implemented method performed in a computerized system comprising a central processing unit, a display device and a memory, the computer-implemented method performed in connection with a video of a content being added to a medium. The method involves: using the central processing unit to detect at least one boundary event in the video; using the central processing unit to segment the video into at least one video segment based on the detected at least one boundary event; using the central processing unit to generate an overview image using at least a portion of the video; using the central processing unit to map a portion of the overview image to the at least one video segment; generating a graphical user interface on the display device, the graphical user interface displaying at least the mapped portion of an overview image; and in response to detection of a selection event of the mapped portion of the overview image by a user, playing the video segment associated with the mapped portion of the overview image.

In accordance with another aspect of the embodiments described herein, there is provided a non-transitory computer-readable medium embodying a set of computer-executable instructions, which, when executed in a computerized system comprising a central processing unit, a display device and a memory in connection with a video of a content being added to a medium, cause the computerized system to perform a method involving: using the central processing unit to detect at least one boundary event in the video; using the central processing unit to segment the video into at least one video segment based on the detected at least one boundary event; using the central processing unit to generate an overview image using at least a portion of the video; using the central processing unit to map a portion of the overview image to the at least one video segment; generating a graphical user interface on the display device, the graphical user interface displaying at least the mapped portion of an overview image; and in response to detection of a selection event of the mapped portion of the overview image by a user, playing the video segment associated with the mapped portion of the overview image.

In accordance with yet another aspect of the embodiments described herein, there is provided a computerized system comprising a central processing unit, a display device and a memory storing a set of instructions executable in connection with a video of a content being added to a medium. The set of instructions includes instructions for: detecting at least one boundary event in the video; segmenting the video into at least one video segment based on the detected at least one boundary event; generating an overview image using at least a portion of the video; mapping a portion of the overview image to the at least one video segment; generating a graphical user interface on the display device, the graphical user interface displaying at least the mapped portion of an overview image; and in response to detection of a selection event of the mapped portion of the overview image by a user, playing the video segment associated with the mapped portion of the overview image.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the inventive concept, there are provided systems and methods for generating an overview for certain types of video by reconstructing a representation of the underlying content and linking from points in the overview to specific points in the video. In one embodiment, a two-dimensional overview image is generated when the content in the video is two-dimensional, such as when the video depicts content being continuously added onto an electronic whiteboard. Such two-dimensional overviews are useful for screencasts, recorded whiteboard lectures, and videos depicting other flat content.

Figure 1:
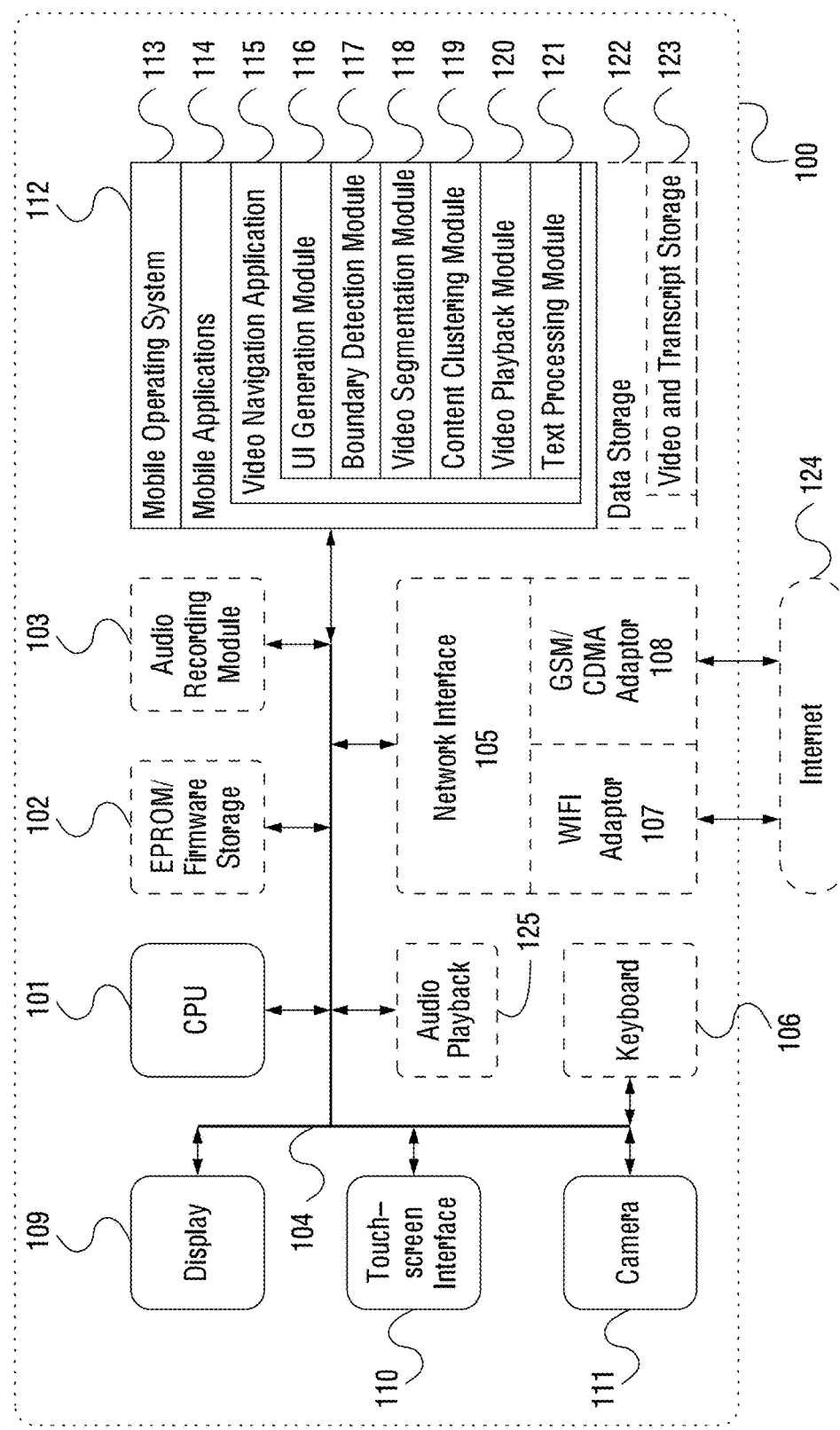
FIG. 1 illustrates an exemplary embodiment of a computerized system for creating spatial overviews for videos and enabling the user to navigate videos during video playback using the created spatial overviews.

FIG. 1 illustrates an exemplary embodiment of a computerized system 100 for creating spatial overviews for videos and enabling the user to navigate videos during video playback using the created spatial overviews. In one or more embodiments, the computerized system 100 may be implemented within the form factor of a mobile computing device, such as a smartphone, a personal digital assistant (PDA), or a tablet computer, all of which are available commercially and are well known to persons of skill in the art. In an alternative embodiment, the computerized system 100 may be implemented based on a laptop or a notebook computer. Yet in an alternative embodiment, the computerized system 100 may be an embedded system, incorporated into an electronic device with certain specialized functions, such as an electronic book (or e-book) reader. Yet in an alternative embodiment, the computerized system 100 may be implemented as a part of an augmented reality head-mounted display (HMD) systems, also well known to persons of ordinary skill in the art.

The computerized system 100 may include a data bus 104 or other interconnect or communication mechanism for communicating information across and among various hardware components of the computerized system 100, and a central processing unit (CPU or simply processor) 101 coupled with the data bus 104 for processing information and performing other computational and control tasks. Computerized system 100 also includes a memory 112, such as a random access memory (RAM) or other dynamic storage device, coupled to the data bus 104 for storing various information as well as instructions to be executed by the processor 101. The memory 112 may also include persistent storage devices, such as a magnetic disk, optical disk, solid-state flash memory device or other non-volatile solid-state storage devices.

In one or more embodiments, the memory 112 may also be used for storing temporary variables or other intermediate information during execution of instructions by the processor 101. Optionally, computerized system 100 may further include a read only memory (ROM or EPROM) 102 or other static storage device coupled to the data bus 104 for storing static information and instructions for the processor 101, such as firmware necessary for the operation of the computerized system 100, basic input-output system (BIOS), as well as various configuration parameters of the computerized system 100.

In one or more embodiments, the computerized system 100 may incorporate a display device 109, which may be also coupled to the data bus 104, for displaying various information to a user of the computerized system 100. In an alternative embodiment, the display 109 may be associated with a graphics controller and/or graphics processor (not shown). The display device 109 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 109 may be incorporated into the same general enclosure with the remaining components of the computerized system 100. In an alternative embodiment, the display device 109 may be positioned outside of such enclosure.

In one or more embodiments, the display device 109 may be implemented in a form of a projector or a mini-projector configured to project information on various objects, such as glasses worn by the user. In one or more embodiments, the display device 109 may be configured to be mountable on the head of the user. To this end, the display device 109 may be provided with suitable mounting hardware (not shown).

In one or more embodiments, the computerized system 100 may further incorporate an audio playback device 125 connected to the data bus 104 and configured to play various audio files, such as MPEG-3 files, or audio tracks of various video files, such as MPEG-4 files, well known to persons of ordinary skill in the art. To this end, the computerized system 100 may also incorporate waive or sound processor or a similar device (not shown).

In one or more embodiments, the computerized system 100 may incorporate one or more input devices, such as a touchscreen interface 110 for receiving user's tactile commands, a camera 111 for acquiring still images and video of various objects, as well as a keyboard 106, which all may be coupled to the data bus 104 for communicating information, including, without limitation, images and video, as well as user command selections to the processor 101. In an alternative embodiment, input devices may include a system for tracking eye movements of the user (not shown), which may be used to indicate to the computerized system 100 the command selection made by the user.

In one or more embodiments, the computerized system 100 may additionally include an audio recording module 103 configured to record audio signal, such as narration of the content by the presenter and, optionally, convert the recorded audio signal into textual representation using, for example OCR algorithms well known to persons of skill in the art.

In one or more embodiments, the computerized system 100 may additionally include a communication interface, such as a network interface 105 coupled to the data bus 104. The network interface 105 may be configured to establish a connection between the computerized system 100 and the Internet 124 using at least one of WIFI interface 107 and the cellular network (GSM or CDMA) adaptor 108. The network interface 105 may be configured to provide a two-way data communication between the computerized system 100 and the Internet 124. The WIFI interface 107 may operate in compliance with 802.11a, 802.11b, 802.11g and/or 802.11n protocols as well as Bluetooth protocol well known to persons of ordinary skill in the art. In an exemplary implementation, the WIFI interface 107 and the cellular network (GSM or CDMA) adaptor 108 send and receive electrical or electromagnetic signals that carry digital data streams representing various types of information.

In one or more embodiments, the Internet 124 typically provides data communication through one or more sub-networks to other network resources. Thus, the computerized system 100 is capable of accessing a variety of network resources located anywhere on the Internet 124, such as remote media servers, web servers, other content servers as well as other network data storage resources. In one or more embodiments, the computerized system 100 is configured send and receive messages, media and other data, including application program code, through a variety of network(s) including Internet 124 by means of the network interface 105. In the Internet example, when the computerized system 100 acts as a network client, it may request code or data for an application program executing on the computerized system 100. Similarly, it may send various data or computer code to other network resources.

In one or more embodiments, the functionality described herein is implemented by computerized system 100 in response to processor 101 executing one or more sequences of one or more instructions contained in the memory 112. Such instructions may be read into the memory 112 from another computer-readable medium. Execution of the sequences of instructions contained in the memory 112 causes the processor 101 to perform the various process steps described herein. In alternative embodiments, hard-wired circuitry may be used in place of or in combination with software instructions to implement the embodiments invention. Thus, embodiments of the invention are not limited to any specific combination of hardware circuitry and software.

The term "computer-readable medium" as used herein refers to any medium that participates in providing instructions to processor 101 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 101 for execution. For example, the instructions may initially be carried on a magnetic disk from a remote computer. Alternatively, a remote computer can load the instructions into its dynamic memory and send the instructions over the Internet 124. Specifically, the computer instructions may be downloaded into the memory 112 of the computerized system 100 from the foresaid remote computer via the Internet 124 using a variety of network data communication protocols well known in the art.

In one or more embodiments, the memory 112 of the computerized system 100 may store any of the following software programs, applications or modules:

1. Operating system (OS) 113, which may be a mobile operating system for implementing basic system services and managing various hardware components of the computerized system 100. Exemplary embodiments of the operating system 113 are well known to persons of skill in the art, and may include any now known or later developed mobile operating systems.

2. Applications 114 may include, for example, a set of software applications executed by the processor 101 of the computerized system 100, which cause the computerized system 100 to perform certain predetermined functions, such as acquire digital images using the camera 111 or play media files using the display 109 and/or an audio playback device 125. In one or more embodiments, the applications 114 may include an inventive video navigation application 115, described in detail below.

3. Data storage 122 may be used, for example, for storing video files used in connection with the inventive video navigation application 115 as well as textual transcript data representing the narration of the content in the video by the presenter, see 123. In addition, other data received by the computerized system 100 over the Internet 124 may also be stored in the data storage 122.

In one or more embodiments, the inventive video navigation application 115 may incorporate a graphical user interface generation module 116 configured to generate an inventive graphical user interface for navigation within video on the display 109 of the computerized system 100. The inventive video navigation application 115 may further include a boundary detection module 117 for detecting boundary events in the video, a video segmentation module 118 for segmenting the video based on the detected boundary events and a content clustering module 119 for clustering content based, for example, on the detected bounding boxes. Additionally provided may be the video playback module 120 for playing the video segments in accordance with the selection made by the user and the appropriate mappings, as well as a text processing module 121 for processing textual representation of the transcript of presenter's narrations in the video.

Figure 2:
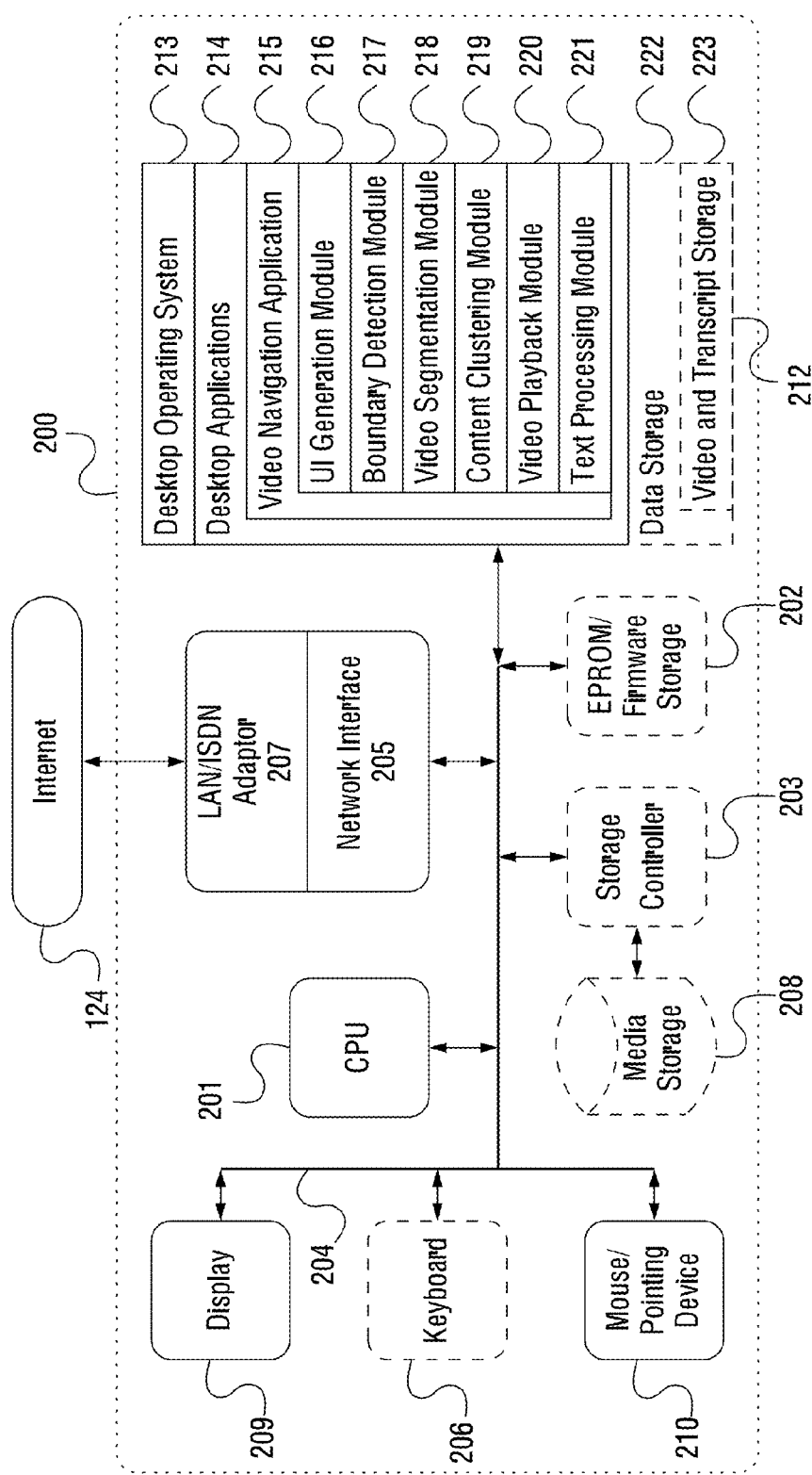
FIG. 2 illustrates an exemplary embodiment of a computerized desktop system for creating spatial overviews for videos and enabling the user to navigate videos during video playback using the created spatial overviews.

In one or more embodiments, the video is processed locally, in the mobile computerized system 100. However, as it would be appreciated by those of skill in the art, the local video processing may demand substantial video processing power, which may not be available in the computerized system 100. Therefore, in an alternative embodiment, the video content may be sent for analysis to a remote computer system, such as the computerized desktop system 200, en exemplary embodiment of which is illustrated in FIG. 2.

In one or more embodiments, the computerized desktop system 200 may incorporate a data bus 204, which may be substantially similar and may perform substantially similar functions as the data bus 104 of the computerized system 100 illustrated in FIG. 1. In various embodiments, the data bus 204 may use the same or different interconnect and/or communication protocol as the data bus 104. The one or more processors (CPUs) 201, the network interface 205, the EPROM/Firmware storage 202, the display 209 and the keyboard 206 of the computerized desktop system 200 may be likewise substantially similar to the respective processor 101, the network interface 105, the EPROM/Firmware storage 102, the display 109 and the keyboard 106 of the computerized system 100, except that the former components are deployed in a desktop platform configuration. In various implementations, the one or more processor 201 may have substantially increased processing power as compared with the processor 101.

In addition to the input device 206 (keyboard), the computerized desktop system 200 may additionally include a cursor control device 210, such as a mouse, a trackball, or cursor direction keys for communicating direction information and command selections to processor 201 and for controlling cursor movement on the display 209. This input device typically has two degrees of freedom in two axes, a first axis (e.g., x) and a second axis (e.g., y), that allows the device to specify positions in a plane.

The LAN/ISDN adaptor 207 of the computerized desktop system 200 may be implemented, for example, using an integrated services digital network (ISDN) card or a modem to provide a data communication connection to a corresponding type of telephone line, which is interfaced with the Internet 124 using Internet service provider's hardware (not shown). As another example, the LAN/ISDN adaptor 207 may be a local area network interface card (LAN NIC) to provide a data communication connection to a compatible LAN and the Internet 124. To store various media files, the computerized desktop system 200 may be provided with a media storage 208 connected to the data bus 204 by means of a storage controller 203.

In one or more embodiments, the memory 212 of the computerized desktop system 200 may store any of the following software programs, applications or modules:

1. Desktop operating system (OS) 213, which may be an operating system for implementing basic system services and managing various hardware components of the computerized desktop system 200. Exemplary embodiments of the desktop operating system 213 are all well known to persons of skill in the art, and may include any now known or later developed operating systems.

3. Desktop applications 214 may include, for example, a set of software applications executed by one or more processors 201 of the computerized desktop system 200, which cause the computerized desktop system 200 to perform certain predetermined functions or tasks. In one or more embodiments, the desktop applications 214 may include an inventive video navigation application 215, described in detail below. In one or more embodiments, the inventive video navigation application 215 may incorporate a graphical user interface generation module 216 configured to generate an inventive graphical user interface for navigation within video on the display 109 of the computerized system 100. The inventive video navigation application 215 may further include a boundary detection module 217 for detecting boundary events in the video, a video segmentation module 218 for segmenting the video based on the detected boundary events and a content clustering module 219 for clustering content based, for example, on the detected bounding boxes. Additionally provided may be the video playback module 220 for playing the video segments in accordance with the selection made by the user and the appropriate mappings, as well as a text processing module 221 for processing textual representation of the transcript of presenter's narrations in the video.

The operation of the aforesaid modules of the inventive video navigation application 215 is substantially similar to the operation of the respective modules of the video navigation application 115 deployed on the computerized system 100 and will be described in detail below.

4. Data storage 222 may be used, for example, for storing video files used in connection with the inventive video navigation application 215 as well as textual transcript data representing the narration of the content in the video by the presenter, see 223. In addition, other data received by the computerized desktop system 200 over the Internet 124 may also be stored in the data storage 222.

In one or more embodiments, the inventive video navigation application 215 may be configured to receive the video captured by the computerized system 100 shown in FIG. 1 via the Internet 124 by means of the network interface 205. The received video may be processed using the above-describe modules and shown to the user using the display 209, having the graphical user interface generated by the user interface generation module 216.

The operation of the various software modules deployed on the computerized system 100 and the computerized desktop system 200 will now be described in detail. As would be appreciated by those of skill in the art, there are several scenarios in which a video captures the progressive accumulation of content. A prominent example is a video from the Khan Academy series, well known to persons of ordinary skill in the art. In these educational videos, the camera focuses on an electronic whiteboard as the presenter adds content with electronic ink. Over the course of the video, annotations are added until the board is filled. Subsequently, the presenter optionally scrolls to an unmarked region of the board to continue to add annotated content.

It should be noted that for the content of this nature, there is a unique relationship between the temporal and spatial dimensions of the content. A natural temporal segmentation of the video identifies the presenter annotations as they are added. This implies that each annotation (and its spatial location in the video frame) is associated with a temporal segment of the video. For such content, it's natural to allow users to navigate video temporally using a spatial index based on the presenter annotations. Therefore, in one or more embodiments, there are provided systems and methods for generating an overview image that displays the complete set of annotations and which is usable for navigating the associated video content.

It should be also noted that the educational or other expository videos are frequently continuously narrated by the presenter. In one or more embodiments, these narrations are recorded using an audio pickup device 103 and subsequently converted to text using the narration module 119. In various embodiments, spoken text is obtained from the audio recordings of the narration using manual closed captions (CC) or by means of automatic speech recognition (ASR). In one or more embodiments, the computerized systems 100 and 200 may use any known and/or commercially available ASR software algorithm well known to persons of ordinary skill in the art.

In one or more embodiments, the text processing module 121(221) is configured to time stamp the resulting textual transcripts of speaker narrations, so that each presenter annotation recorded in the video is associated with spoken text from the time segment during which the annotation was added. The recorded video with speaker annotations and the associated textual speaker narrations are stored in the video and transcript storage unit 123(223).

In one or more embodiments, to facilitate the convenient navigation of the recorded video and the associated speaker narrations, both the video and the associated narration transcript are segmented based on the detected boundary events described in detail below. In one or more embodiments, the boundary detection module 117(217) first detects points of significant change of the annotations recorded in the video that can indicate slide change events.

Figure 3:
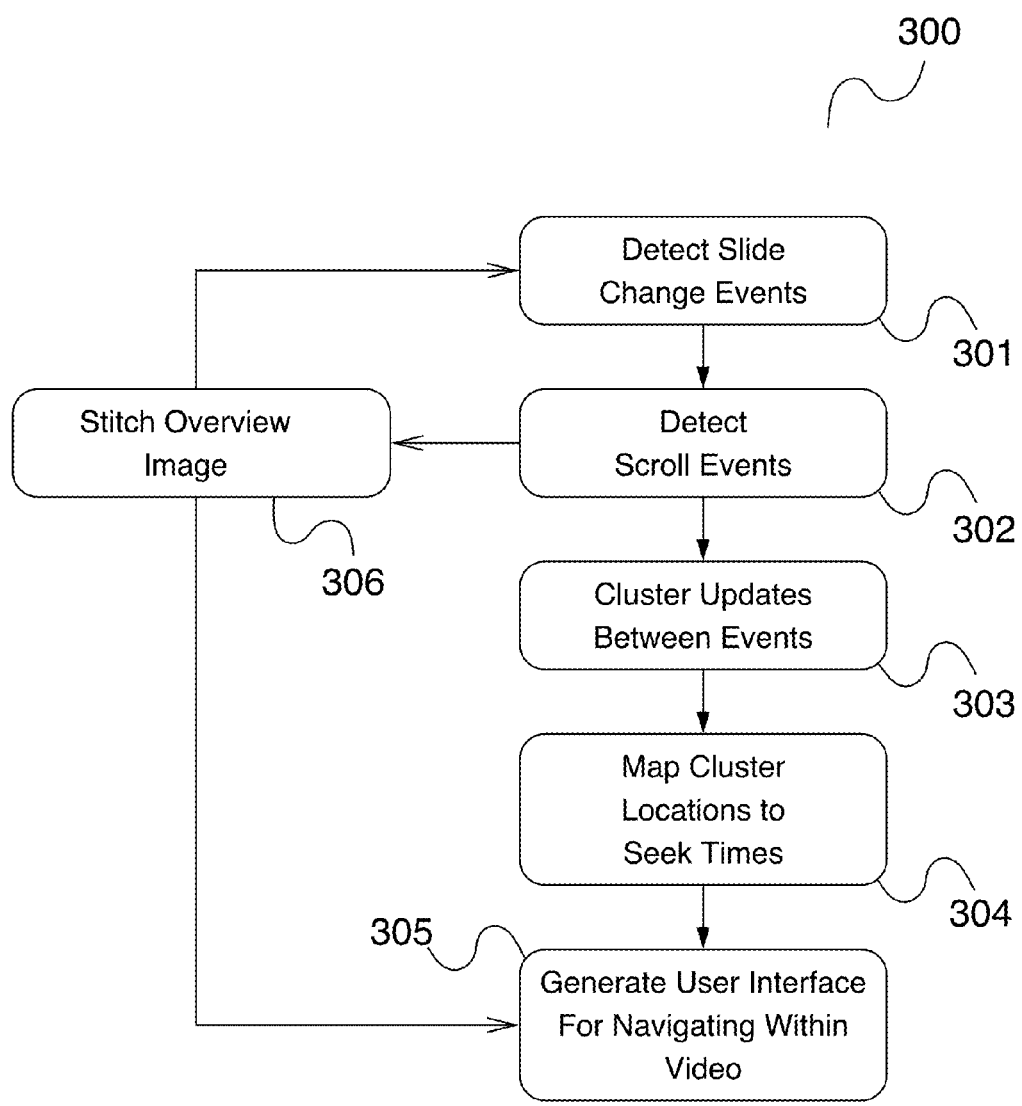
FIG. 3 illustrates an exemplary embodiment of a computer-implemented method for generating overviews for certain two-dimensional content.

FIG. 3 illustrates an exemplary embodiment of a computer-implemented method 300 for generating navigable overviews for certain two-dimensional content. First, a slide change event is detected in step 301. In one or more embodiments, the slide changes are detected as points of significant change, such as when an annotation is completed. In one or more embodiments, the slide changes are detected using well-known methods described, for example, in U.S. Pat. Nos. 8,261,200 and 8,280,158.

In one or more embodiments, a simple per-pixel frame differencing is first applied to detect changes in the video frames indicating that an annotation is being added. The second step is to apply a temporal threshold for a stable content. As would be appreciated by persons of skill in the art, when the video frame remains stable for a predetermined amount of time, the annotation is likely to have been completed. Thus, the algorithm identifies segments in the video by first detecting periods of change followed by a minimal (at least several seconds long) period of video frame stability.

In one or more embodiments, after the detection of a new annotation event, the method applies spatial analysis using connected components to the binarized difference image created by per-pixel thresholding the last stable video frame (before the new annotation) with the current stable frame (after the annotation). This enables the algorithm to identify a bounding box (rectangle) that delineates the spatial region containing the new annotation.

For each slide change event detected in step 301, the inventive method 300 detects the content scroll event times and their respective scroll offsets in step 302. As would be appreciated by those of skill in the art, in expository videos the instructor fills the screen and typically scrolls (either up-and-down or sideways) to access empty space for additional annotation while allowing the most recently added content to remain in view. In accordance with one or more embodiments, these scroll events are treated by the video segmentation module 118(218) analogously to the slide changes that occur in other types of expository video.

The width of the bounding box identified in step 301 is a reliable cue for scroll detection. When the width of the bounding box approximates the width of the video (i.e., exceeds a frame-width dependent threshold), the method records a scroll event. The amount of the scroll (frame width or height in pixels) is detected by aligning the frames before and after the scroll event. In one or more embodiments, this is done efficiently by first selecting a subset of columns with high pixel intensity entropy. Such columns have a range of colors and are more reliable for alignment. The computer-implemented method then calculates the (1D) correlation between the corresponding columns (rows) of the video frames before and after the video scroll, and records the shift producing maximum correlation for each. It reports the scroll amount as the majority vote among the set of estimated shifts of the individual columns (rows). In alternative embodiments, the aforesaid processing can produce various confidence measures in its estimate to aid in semi-automatic processing or manual correction. It should be noted that changing the number of columns (rows) used for this computation allows for trading off complexity with accuracy in estimating the shift.

In an alternative embodiment, the scrollable regions of the content are detected even when the width of the bounding box does not approximate the width of the video. This feature is useful for situations, where the scrolled material occupies only a region in a video stream.

In one or more embodiments, the computer-implemented method also integrates segment boundaries detected using previously disclosed approaches. For example, the region detection methods described, for example in U.S. patent application Ser. No. 13/647,248, filed on Oct. 8, 2012, can be used to define boundary events. For the case of content that may contain camera pans and zooms, an embodiment of the disclosed computerized method uses automatic methods based on optical flow analysis to detect pans and zooms in accordance with techniques taught, for example, in Rong Jin, Yanjun Qi, Alexander Hauptmann, A Probabilistic Model for Camera Zoom Detection, Proc. Intl. Conf. on Pattern Recognition, 2002, and to distinguish them from scroll events and slide changes.

Figure 4:
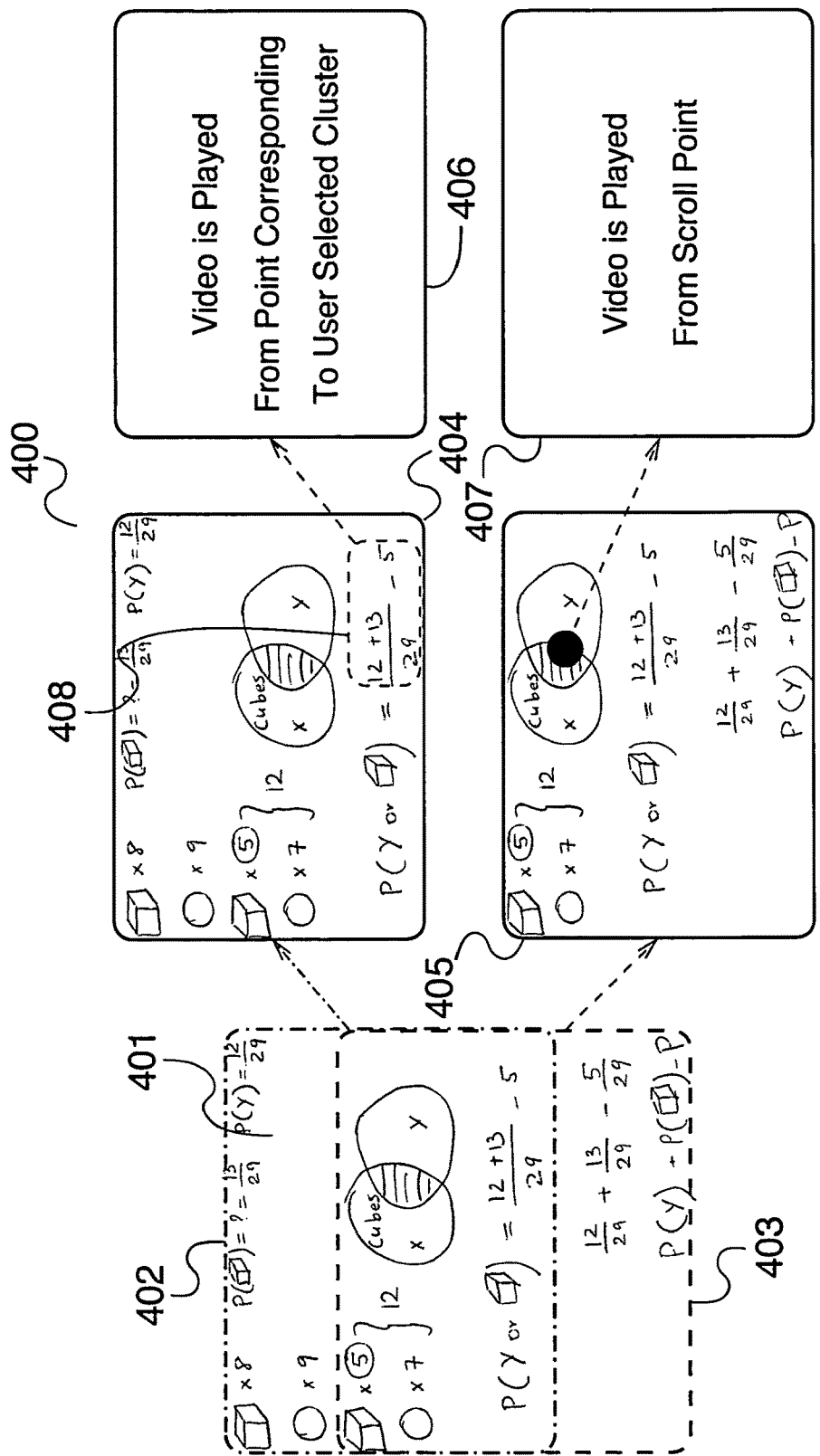
FIG. 4 illustrates an exemplary embodiment of a user interface for navigating within video using an overview image.

After detecting significant boundary events (slide change and scroll events) as well as their subordinate annotation boundary boxes the computerized system 100(200) generates interactive overview images so that users can navigate the video spatially. In one embodiment, the overview image displays the complete set of annotations made by the presenter and captured in the video. An exemplary embodiment of the aforesaid overview image is illustrated in FIG. 4, item 401. In an alternative embodiment, the overview image includes only a portion of the annotations made by the presenter. In this embodiment, a timeline portion is provided below the overview image that progressively shows annotations as they were drawn by the presenter. Using this timeline portion, the users are able to "replay" how annotations where drawn.

In accordance with the method 300, the slide updates are then stitched into a single image, see step 306. Given the estimates for the amount of scrolling, in step 306, the process stitches the frames collected just before detected scroll events (to maximize annotated content displayed) to create the complete overview image. In one exemplary embodiment, the overview image height is larger than the height of the video frame, while its width is the same. In accordance with the method 300, a separate process clusters content updates made between scroll events, see step 303. In one embodiment, the scroll times detected in step 302 provide coarse navigation control for the video while the content clusters detected in step 303 provide more fine-grained navigational control, as will be illustrated below in connection with FIG. 4.

In one or more embodiments, this overview image is navigated on a mobile computing device, such as a smartphone or a tablet using the familiar vertical swiping interaction. Detection of clicking or selecting on part of the overview region by the results in the computerized system 100 playing the video seeking directly to the segment in which the viewable presenter annotations appear. This video segment is generally between detected scroll events.

In one or more embodiments, the bounding boxes of text added between the scroll events are processed to enhance navigation of the overview image. In one example, hierarchical clustering of the set of detected change bounding boxes is used to flexibly adjust the number (granularity) of time points at which the user can jump into the video. Grouping by time is the most natural approach; however, incorporating spatial information (bounding box locations) into the clustering is a possible extension. This is helpful when the content is added in a consistent manner such as "left to right" or "up to down". In one embodiment, when the user taps an annotation shown in the inventive user interface, the video segment is played that corresponds to the cluster of annotation bounding boxes, as shown in FIG. 4.

After the clusters have been so identified, the cluster locations are mapped to video seek times at step 304, such that user's selecting a particular cluster is translated to specific temporal video segment. Finally, both the overview image generated in step 306 and the mappings generated in step 304 are used in providing a user interface for navigating within video, see step 305.

FIG. 4 illustrates an exemplary operation of the user interface 400 for navigating within video using the aforesaid overview image 401. As stated above, the overview image 410 is higher than the height of a standard video frame. In one or more embodiments, the generated user interface 400 enables the user to scroll the overview image 401 between the scroll events detected in step 302, which correspond to scroll positions 402 and 403 shown in FIG. 4. In one embodiment, the inventive user interface 400 may enable the user to navigate (scroll) the overview image 401 using the familiar vertical swiping interaction, which may be detected by the inventive graphical user interface generation modules 116(216) by means of the touch-screen interface 110 or pointing device 210, respectively.

Based on the user's scroll selection, the user interface 400 shows either a video frame 404 before the scroll event, or a later video frame 405 after the scroll event and the subsequent addition of annotations. As can be seen from FIG. 4, the shown video frame 404 corresponds to the upper (earlier in time) portion 402 of the overview image 401, while the video frame 405 corresponds to the lower (later in time) portion 403 of the overview image 401. In one or more embodiments, the inventive graphical user interface generation module 116(216) is configured to detect an event, when the user selects a cluster within a specific video frame, such as cluster 408 within frame 404. Upon detection of such cluster selection by the user, the video playback module 120(220) is configured to play a video segment 406 in which the annotations within the selected cluster were added. The start time of the aforesaid segment is determined based on the mapping generated in step 304 of the process of FIG. 3. In one embodiment, the segment may include a portion of the video between the scroll events.

In one or more embodiments, when the user taps the screen with one finger the system navigates the video to the selected scroll event time, hides the screens 404 or 405 with the portions of the overview image 401, and begins playing the video, see 407. The user can return back to the overview image by tapping the screen with two fingers simultaneously.

It should be noted that the embodiment of the method 300 illustrated in FIG. 3 can also be applied to videos that overlay slide streams with electronic ink. In this case, the slide change detection step 301 shown in FIG. 3 identifies new slides. This data resembles the projector-based video streams described, for example, in the aforesaid U.S. Pat. No. 8,261,200 and related keyframe selection techniques can be used, again relying primarily on detecting pixel level changes. As would be appreciated by persons of skill in the art, scrolls are uncommon in this class of videos. However, a single slide can be shown for more extended periods of time. In such a case, the addition of ink stroke clustering and bounding box detection described herein can be helpful as before.

Therefore, an embodiment of the inventive graphical user interface generated by the graphical user interface generation module 116(216), may display all distinct slides to the user, wherein the slides are shown with all added presenter annotations. Such an interface may provide the user with a hierarchical non-linear access to the respective segments of the video as well as corresponding narration. In accordance with one or more embodiments, users can first indicate a slide segment of interest, which is detected by the inventive user interface. By again selecting an annotation shown on the overview thumbnail for that slide segment, users are enabled to navigate to the sub-segment in which the annotation is added and cause the corresponding video segment to be played.

Figure 5:
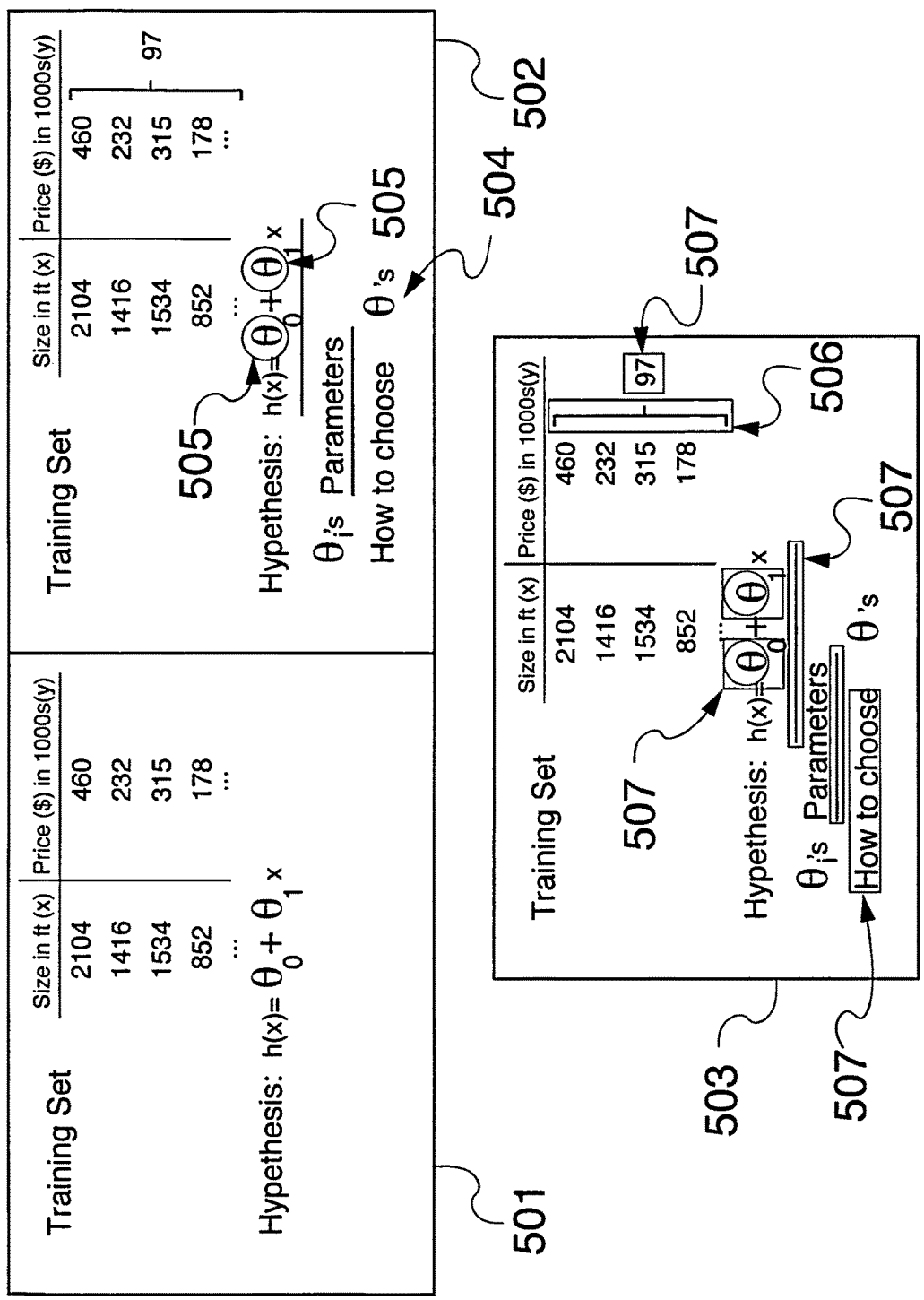
FIG. 5 illustrates an exemplary embodiment of a graphical user interface displaying a slide content.

An exemplary embodiment of a graphical user interface displaying the aforesaid slide content is illustrated in FIG. 5. Specifically, a frame 501 is the first frame and a frame 502 is the last frame from an automatically detected slide video segment. The addition of both the slide text 504 and presenter annotations 505 is evident through the course of the time the slide appears in the video. A frame 503 at the bottom shows the results of annotation detection and clustering performed in accordance with the above-describe techniques. Each of the two clusters of annotations 506 and 507 shown in FIG. 5 partitions the slide video segment in time into subshots. Upon detection of the user's selecting the specific annotations, the corresponding subshot is played. As would be appreciated by those of skill in the art, this type of interface allows users a second level of non-linear access to the video. In one or more embodiments, the spoken text of the presenter is used as a cue to refine either the clustering of annotations or the subshot segmentation.

Figure 6:
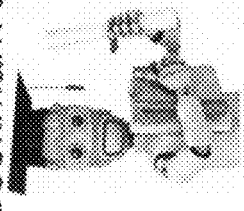
FIG. 6 illustrates an exemplary use of detected boundary events to navigate a video content on mobile devices.
Figure 6:
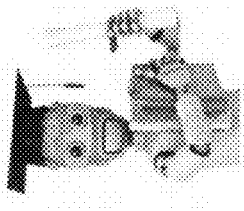

In one or more embodiments, the boundary events are also used to support navigation patterns beyond overviews. For example, on small screen devices there may not be sufficient screen real estate to display an overview image in addition to the video content. In this situation, in one embodiment of a video navigation user interface, the boundary event times are mapped to touch-based flick events, so that the video will navigate to the next or previous event boundary when the user swipes the screen right or left, as illustrated in FIG. 6. With reference to FIG. 6, when the user swipes the screen 601 to boundary (bookmark 3) 602, the video navigates to the start of the boundary event, see frame 603 and begins playing the video, see 604.

Figure 7:
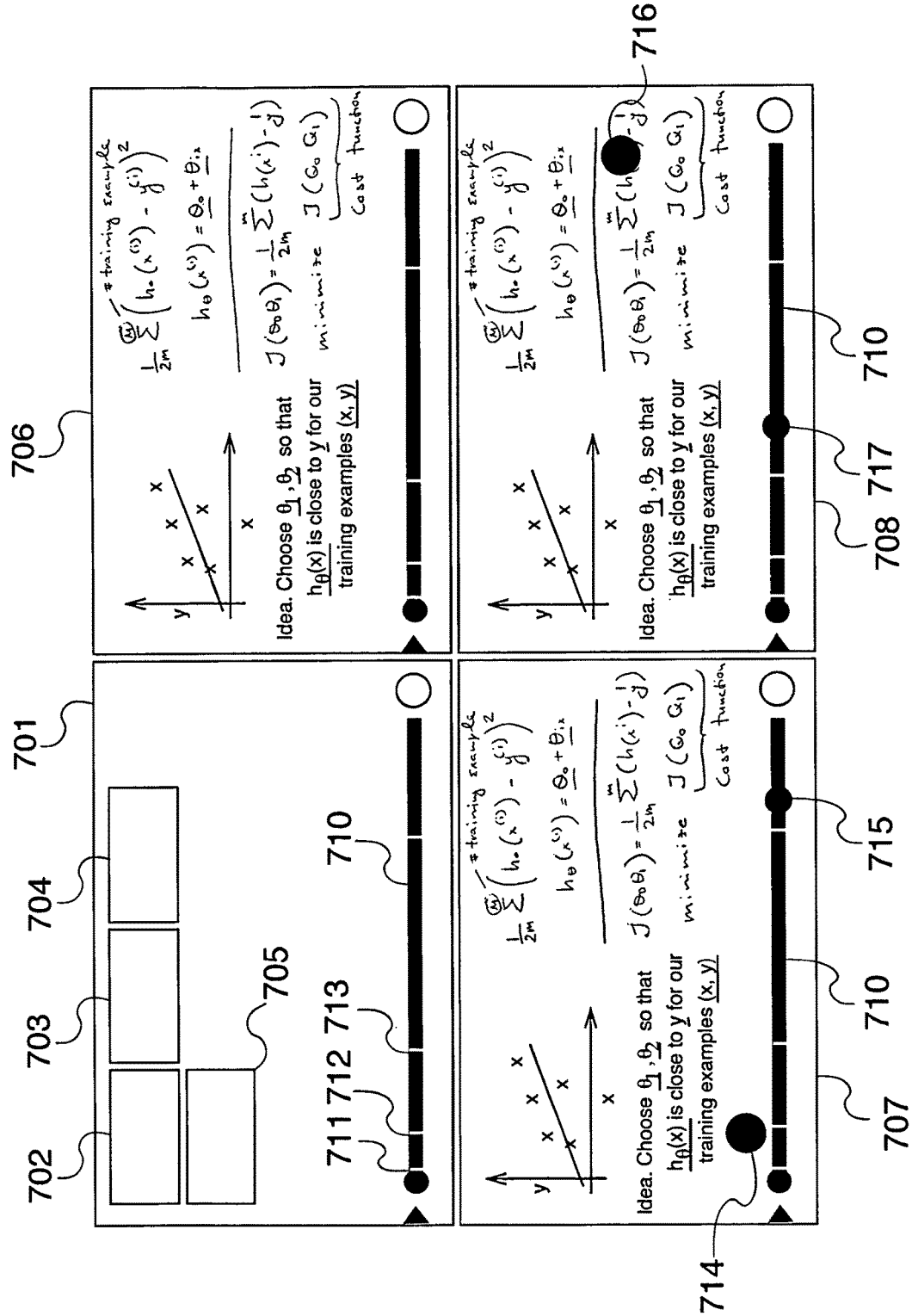
FIG. 7 illustrates an exemplary embodiment of a user interface for navigating within a video by selecting a region within an overview image.

With reference to FIG. 7, the user first uses the graphical user interface screen 701 to select one of the displayed overview image 702, 703, 704 or 705, which is then displayed in a graphical user interface screen 706.

In one or more embodiments, as illustrated in FIG. 7, boundary events 711, 712 and 713 are also represented temporally on a timeline 710. For example, these events may be indicated as bookmarks. This enables the user to navigate to a specific boundary event directly by simply interacting with the aforesaid timeline portion of the graphical user interface. The computerized system detects the user interaction with the timeline and forwards or rewinds the video to the appropriate time point corresponding to the selected boundary event.

Furthermore, in one or more embodiments, when interacting with a navigable overview with subshots, pressing and holding a region of the overview image will cause the computerized system to generate a feedback (an indicator) on the timeline indicating to what time the video would seek if the user were to click on that region, as illustrated, for example, in FIG. 7. As shown in that figure, when the user touches region 714 on the overview image 707, the inventive user interface displays indicator 715 on the timeline 710 indicating the video time point corresponding to the location 714 on the overview image 707. Similarly, if the region 716 is touched, the indicator 717 is displayed. If the user clicks on either region, the video is played from the respective time point. Thus, using the exemplary graphical user interface shown in FIG. 7, users can navigate video directly by selecting a region of the overview image.

In one or more embodiments, the aforesaid indicator 715 or 717 may be dynamic in the sense that it is configured to move along the timeline 710 when the user drags his finger around the overview image 707 or 708 indicating, at any given time, the corresponding video time point mapped to the overview image sub-region. In one or more embodiments, a keyframe may also be displayed next to the preview cursor in a form of an image thumbnail. In one or more embodiments, when the user releases the screen, the system navigates to the indicated video time point after a predetermined delay.

In one or more embodiments, in addition to displaying the indicators to show users where in the timeline the video would seek, the system is further configured to playback the audio such that the users would hear what would be described at the corresponding time point. As would be appreciated by those of skill in the art, playing the audio recording together with showing the aforesaid thumbnail of the video keyframe provide visual and/or auditory cues enabling the user to easily skim the video by interacting with the overview image.

In one or more embodiments, the detected boundary events are used to support video note-taking by automatically associating relevant rich media viewer annotations with manually-defined bookmarks. An embodiment of a graphical user interface shown in FIG. 8, incorporates a button 801. When this button 801 is activated by the user, the computerized system is configured to cause a bookmark to be added to a video while it is playing. In one embodiment, the graphical user interface is configured to automatically attach a video frame as well as transcript text from the marked time in the video as a video annotation.

In addition, utilizing the detected boundary events, the computerized system is capable of optionally associating a proximate overview image as the video annotation. As would be appreciated by those of skill in the art, the overview image adds more context than only a still frame from the video. Furthermore, the computerized system is also capable of selecting all of the transcript text from the previous boundary event through the next boundary event and either automatically associating the selected text with the bookmark or utilizing other appropriate methods to allow the user to select a specific transcript text range.

Figure 8:
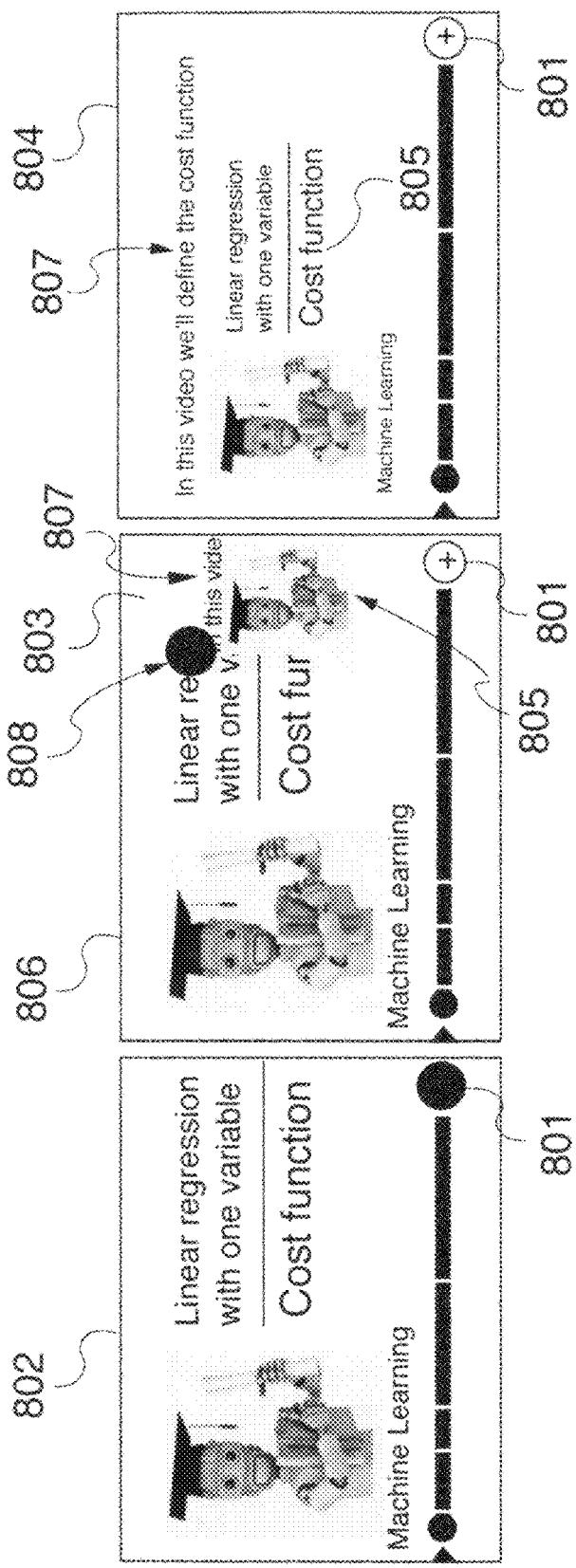
FIG. 8 illustrates an exemplary embodiment of a user interface for creating bookmarks and annotations.

With reference to FIG. 8, the user first activates button 801 on the graphical user interface screen 802 while the video is playing. Upon detection of this event, the computerized system displays graphical user interface screen 806 having a bookmark annotation portion 803. Moreover, the computerized system automatically attaches the overview image 805 corresponding to the closest detected boundary event as the video annotation of the bookmark together with a transcript text 807. This is done based on the boundary event detection methods described above. The user may switch to full bookmark screen 804 by activating the control element 808.

In addition, in one or more embodiments, the secondary segmentation based on the detected presenter annotations is used to enhance the above process by allowing the user to refine spatially the content of interest. Text can be suggested based either on a single annotation that may be selected, the automatically clustered set of annotations as shown in FIG. 5, or the entire slide segment's spoken text. In one or more embodiments, optical character recognition (OCR) is used to make slide text available for selection. The refinement capability using spatial navigation is especially natural on tablets, but also especially valuable given their limited display sizes.

It should be noted that the above-described techniques are not limited to creating navigable overviews for videos of annotations or other content added using electronic ink to electronic whiteboards or to any other specific types of content or medium. Substantially the same techniques may be used in relation to any content added to any medium whatsoever.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for generating and using navigable spatial overviews for video. It is intended that the specification and examples be considered as exemplary only, with a true scope and spirit of the invention being indicated by the following claims.

What is claimed is:

1. A computer-implemented method performed in a computerized system comprising a central processing unit, a display device and a memory, the computer-implemented method performed in connection with a captured video of a content being added to a medium, the computer-implemented method comprising:
   a. using the central processing unit to analyze changes within a plurality of frames of the captured video to automatically detect scrolling, depicted in the captured video, of the medium to which the content is being added (a video boundary event);

b. using the central processing unit to automatically segment the video into a plurality of video segments based on the detected video boundary event;

c. using the central processing unit to generate an overview image using at least a portion of the video, wherein the overview image is a single image comprising content from the plurality of video segments;

d. using the central processing unit to map a plurality of portions of the overview image to the plurality of video segments;

e. generating a graphical user interface on the display device, the graphical user interface comprising a first graphical user interface portion displaying at least the mapped plurality of portions of an overview image; and f. in response to detection of a selection event of one of the mapped plurality of portions of the overview image by a user, playing the video segment associated with the selected mapped portion of the overview image, wherein the video segment is played in a second portion of the generated graphical user interface.

2. The computer-implemented method of claim 1, wherein the content being added to the medium comprises human handwriting.

3. The computer-implemented method of claim 1, wherein the overview image is stitched from the plurality of frames of the captured video based on a scroll distance associated with the detected medium scroll event, wherein in the medium scroll event the medium is scrolled by the scroll distance as depicted in the captured video.

4. The computer-implemented method of claim 1, wherein the video boundary event is a slide change event.

5. The computer-implemented method of claim 1, wherein each mapped portion of the overview image is a content cluster obtained by clustering of the content and wherein the content clustering is performed based on locations of detected bounding boxes enclosing spatial regions on the medium containing portions of the added content.

6. The computer-implemented method of claim 1, further comprising obtaining a textual transcript of a narration associated with the video and segmenting the textual transcript based on the at least one detected video boundary event.

7. The computer-implemented method of claim 1, wherein in c. a plurality of overview images are generated and wherein the graphical user interface comprises an overview image selection portion for selecting the overview image incorporating the displayed mapped portions from the generated plurality of overview images.

8. The computer-implemented method of claim 1, wherein the video boundary event is a plurality of video boundary events and wherein the graphical user interface comprises a video boundary event selection portion for selecting boundary events in the plurality of video boundary events.

9. The computer-implemented method of claim 1, wherein the graphical user interface comprises a timeline portion, the timeline portion comprises at least one video boundary event marker indicating a timing of the video boundary event in the video.

10. The computer-implemented method of claim 9, further comprising, in response to detection of a second selection event of the at least one video boundary event marker by the user, playing the video segment corresponding to the video boundary event.

11. The computer-implemented method of claim 1, wherein the graphical user interface comprises a timeline portion, the computer-implemented method further comprising, in response to detection of a user interaction event with the mapped portion of the overview image, displaying a marker on the timeline portion, the marker indicating a timing of the video segment associated with the mapped portion of the overview image involved in the user interaction event.

12. The computer-implemented method of claim 1, wherein the graphical user interface comprises a timeline portion, the timeline portion comprises at least one video boundary event indicator indicating a timing of the video boundary event in the video.

13. The computer-implemented method of claim 1, further comprising, in response to detection of a user bookmark event, using the at least one detected boundary event to automatically select an information to be associated with a user bookmark corresponding to the user bookmark event.

14. The computer-implemented method of claim 13, wherein the information automatically selected to be associated with the user bookmark comprises a second overview image corresponding to a second detected video boundary event closest in time to the user bookmark event.

15. The computer-implemented method of claim 13, wherein the information automatically selected to be associated with the user bookmark comprises a segment of a textual transcript of a narration associated with the video, the segment being closest in time to the user bookmark event.

16. A non-transitory computer-readable medium embodying a set of computer-executable instructions, which, when executed in a computerized system comprising a central processing unit, a display device and a memory in connection with a captured video of a content being added to a medium, cause the computerized system to perform a method comprising:

a. using the central processing unit to analyze changes within a plurality of frames of the captured video to automatically detect scrolling, depicted in the captured video, of the medium to which the content is being added (a video boundary event);

b. using the central processing unit to automatically segment the video into a plurality of video segments based on the detected video boundary event;

c. using the central processing unit to generate an overview image using at least a portion of the video, wherein the overview image is a single image comprising content from the plurality of video segments;

d. using the central processing unit to map a plurality of portions of the overview image to the plurality of video segments;

e. generating a graphical user interface on the display device, the graphical user interface comprising a first graphical user interface portion displaying at least the mapped plurality of portions of an overview image; and f. in response to detection of a selection event of one of the mapped plurality of portions of the overview image by a user, playing the video segment associated with the selected mapped portion of the overview image, wherein the video segment is played in a second portion of the generated graphical user interface.

17. A computerized system comprising a central processing unit, a display device and a memory storing a set of instructions executable in connection with a captured video of a content being added to a medium, the set of instructions comprising instructions for:

a. automatically analyzing changes within a plurality of frames of the captured video to automatically detect scrolling, depicted in the captured video, of the medium to which the content is being added (a video boundary event);
b. automatically segmenting the video into a plurality of video segments based on the detected video boundary event;
c. generating an overview image using at least a portion of the video, wherein the overview image is a single image comprising content from the plurality of video segments;
d. mapping a plurality of portions of the overview image to the plurality of video segments;
e. generating a graphical user interface comprising a first graphical user interface portion on the display device, the graphical user interface displaying at least the mapped plurality of portions of an overview image; and
f. in response to detection of a selection event of one of the mapped plurality of portions of the overview image by a user, playing the video segment associated with the selected mapped portion of the overview image, wherein the video segment is played in a second portion of the generated graphical user interface.

18. The computerized system of claim 17, wherein the content being added to the medium comprises human handwriting.

19. The computerized system of claim 17, wherein the overview image is stitched from the plurality of frames of the video based on a scroll amount associated with the detected medium scroll event.

20. The computerized system of claim 17, wherein each mapped portion of the overview image is a content cluster obtained by clustering of the content and wherein the content clustering is performed based on locations of bounding boxes enclosing spatial regions on the medium containing portions of the added content.

* * * * *